(12) United States Patent
Ashibe et al.

(10) Patent No.: US 7,989,702 B2
(45) Date of Patent: Aug. 2, 2011

(54) SEALING-END STRUCTURE FOR SUPERCONDUCTING CABLE

(75) Inventors: Yuuichi Ashibe, Osaka (JP); Hideki Itoh, Tokyo (JP)

(73) Assignee: Sumitomo Electric, Ltd., Osaka-shi, Osaka (JP)

( * ) Notice: Subject to any disclaimer, the term of this patent is extended or adjusted under 35 U.S.C. 154(b) by 1060 days.

(21) Appl. No.: 11/794,806

(22) PCT Filed: Nov. 4, 2005

(86) PCT No.: PCT/JP2005/020294
§ 371 (c)(1),
(2), (4) Date: Jul. 6, 2007

(87) PCT Pub. No.: WO2006/075434
PCT Pub. Date: Jul. 20, 2006

(65) Prior Publication Data
US 2008/0017399 A1    Jan. 24, 2008

(30) Foreign Application Priority Data

Jan. 12, 2005 (JP) ................. 2005-005710

(51) Int. Cl.
*H01B 12/00* (2006.01)
(52) U.S. Cl. .................... 174/125.1; 505/230
(58) Field of Classification Search ............ 174/15.1–5, 174/125.1; 505/230–232
See application file for complete search history.

(56) References Cited

FOREIGN PATENT DOCUMENTS

| EP | 0 428 731 A1 | 5/1991 |
|---|---|---|
| EP | 1 283 576 A1 | 2/2003 |
| JP | 124966/1972 | 7/1974 |
| JP | 60-139110 | 7/1985 |
| JP | 2002-238144 | 8/2002 |
| JP | 2002-280628 | 9/2002 |
| JP | 2006-196628 | 7/2006 |
| RU | 2 077 279 C1 | 4/1997 |
| RU | 2000116638 | 8/2002 |

*Primary Examiner* — Jeremy C Norris
(74) *Attorney, Agent, or Firm* — Drinker Biddle & Reath LLP

(57) ABSTRACT

The present invention offers a sealing-end structure for a superconducting cable. The structure performs, through a bushing, the outputting and inputting of electric power between a normal-temperature side and a cryogenic-temperature side, where an end portion of a superconducting cable is placed. The sealing-end structure is provided with a coolant vessel at the cryogenic-temperature side for cooling the bushing. The coolant vessel has a liquid-coolant region filled with a liquid coolant and a gaseous-coolant region filled with a gaseous coolant. The coolant vessel is provided with a contraction-absorbing portion for absorbing the contraction of the coolant vessel when it thermally contracts by the effect of the coolant. The sealing-end structure for a superconducting cable suppresses the deterioration of the sealing performance of sealing members placed at the boundary between the normal-temperature side and the cryogenic-temperature side over a long period of use.

7 Claims, 3 Drawing Sheets

SEALING-END STRUCTURE FOR SUPERCONDUCTING CABLE

TECHNICAL FIELD

The present invention relates to a sealing-end structure for a superconducting cable, the sealing-end structure transferring electric power between a cryogenic-temperature side and a normal-temperature side through a bushing. In particular, the present invention relates to a sealing-end structure for a superconducting cable, the sealing-end structure being capable of absorbing the thermal contraction of a coolant vessel due to the cooling by a coolant.

BACKGROUND ART

As a sealing-end structure for a superconducting cable, the structure shown in FIG. 2 has been known, for example (see Patent literature 1). This sealing-end structure is provided with the following members:
  (a) an end portion of a superconducting cable 100,
  (b) a coolant vessel 101 for housing the end portion,
  (c) a bushing 102 for providing electrical continuity between the superconducting conductor of the cable 100 and the normal-temperature side,
  (d) a vacuum container 103 placed so as to cover the periphery of the coolant vessel 101, and
  (e) a porcelain bushing 104 mounted on the vacuum container 103 so as to be erected at the normal-temperature side.

The bushing 102 is placed from the inside of the coolant vessel 101 to the inside of the porcelain bushing 104 and is provided with the following members:
  (a) a conductor portion 102a that is located at the center portion and that is electrically connected to the superconducting conductor through a joint 105, and
  (b) a solid insulating layer 102b formed with fiber-reinforced plastic (FRP) around the conductor portion 102a so as to cover it.

The bushing 102 is provided with two flanges 102c and 102d on its outer circumference. The flange 102c of the two is fixed to the coolant vessel 101, and the other flange 102d is fixed to the vacuum container 103 and the porcelain bushing 104. The coolant vessel 101 is filled with a liquid coolant, such as liquid nitrogen, for cooling the bushing 102, the joint 105, and the like. The porcelain bushing 104 is filled with an insulating fluid such as insulating oil or sulfur hexafluoride ($SF_6$) gas. A metallic seal is applied between the flange 102c and the coolant vessel 101 and between the flange 102d and the porcelain bushing 104 to seal the coolant vessel 101 and other members airtightly. To reduce the heat intrusion from the normal-temperature side to the cryogenic-temperature side, the vacuum container 103 is provided with an intermediate vacuum portion 103a, which is a space enclosed by the flanges 102c and 102d and the members for connecting the flange 102c with the flange 102d.
Patent literature 1: the published Japanese patent application Tokukai 2002-238144.

DISCLOSURE OF THE INVENTION

Problem to be Solved by the Invention

In the conventional sealing-end structure described above, when the coolant is introduced into the coolant vessel, the coolant vessel thermally contracts because it is cooled by the coolant. In the conventional sealing-end structure, however, a mechanism for absorbing the thermal contraction has not been considered.

In addition, in the conventional sealing-end structure described above, the sealing performance may deteriorate in the vicinity of the boundaries between the coolant vessel and the flange, between the porcelain bushing and the flange, and so on.

In view of the above circumstances, a main object of the present invention is to offer a sealing-end structure for a superconducting cable, the sealing-end structure being capable of absorbing the thermal contraction of a coolant vessel due to the cooling by a coolant. Another object of the present invention is to offer a sealing-end structure for a superconducting cable, the sealing-end structure being capable of suppressing the reduction of the airtightly sealing performance over a long period of use.

Means to Solve the Problem

The present invention attains the foregoing object by providing the coolant vessel with a mechanism for absorbing the thermal contraction. More specifically, the present invention offers a sealing-end structure for a superconducting cable, the sealing-end structure performing, through a bushing, the outputting and inputting of electric power between a normal-temperature side and a cryogenic-temperature side, at which an end portion of a superconducting cable is placed. The sealing-end structure is provided with a coolant vessel at the cryogenic-temperature side for cooling the foregoing bushing. The coolant vessel is filled with a liquid coolant and a gaseous coolant. The present invention has the utmost feature in that the coolant vessel is provided with a contraction-absorbing portion for absorbing the contraction of the coolant vessel when it thermally contracts by the effect of the coolant. In addition to the above-described structure, a sealing-end structure of the present invention provides the coolant vessel with a portion having a specific size for controlling the balance between the pressure of the gaseous coolant and that of the liquid coolant. More specifically, in addition to the above-described structure, a sealing-end structure of the present invention is provided with a narrow-clearance portion that is designed such that:
  (a) the clearance between the inner surface of the narrow-clearance portion and the outer circumference of the bushing has a magnitude that not only maintains the gaseous coolant at a gaseous state without pressurizing it by using a compressor but also maintains the pressure of the gaseous coolant and that of the liquid coolant in equilibrium; and
  (b) a region in which the boundary between the liquid coolant and the gaseous coolant lies is formed at the narrow-clearance portion.

The above-described conventional sealing-end structure has a structure in which the flange provided on the outer circumference of the bushing is brought into direct contact with the coolant. Consequently, when the coolant is introduced into the coolant vessel, the bushing and coolant vessel create thermal contraction resulting from the cooling by the coolant. In view of this phenomenon, Patent literature 1 has disclosed a structure in which the connecting member constituting the intermediate vacuum portion is formed with a corrugated pipe in order to allow the flange to move so that the flange can be prevented from being subjected to excessive stress. However, no consideration is given to the coolant vessel. In addition, in the above-described conventional sealing-end structure, when it is intended to provide a sufficient temperature gradient in the vicinity of the bushing, the length in the direction from the cryogenic-temperature side to the normal-temperature side must be extended, increasing the size of the sealing-end structure. Furthermore, in the above-described conventional sealing-end structure, problems may be created because of the difference in the rate of thermal contraction between the material of the bushing (FRP) and the material of the coolant vessel (stainless steel) when the temperature varies from the normal temperature at the time of the assembly to the coolant temperature. More specifically, the relative position between the sealing surfaces may deviate to a certain extent to produce a gap. The bolt fastening the sealing members may also be loosened. As a result, the sealing performance may be deteriorated.

In contrast, a sealing-end structure of the present invention having a contraction-absorbing portion in the coolant vessel can sufficiently absorb the amount of contraction of the coolant vessel even when the coolant vessel creates thermal contraction due to the cooling by the coolant introduced into the coolant vessel. Consequently, the sealing-end structure can effectively prevent problems accompanying the thermal contraction, such as the destruction of the sealing-end structure.

In addition, a sealing-end structure of the present invention provides the coolant vessel with a narrow-clearance portion. The narrow-clearance portion allows the coolant vessel to have the following two regions:
(a) a gaseous-coolant region at its normal-temperature side, the region having a relatively high temperature due to the intruding heat from the normal-temperature side, and
(b) a liquid-coolant region whose temperature decreases as the position moves to the interior of the liquid-coolant region.

In other words, the sealing-end structure of the present invention is provided with a region having a sufficient temperature gradient form the cryogenic-temperature side to the normal-temperature side. As a result, the bushing housed in the narrow-clearance portion also has a sufficient temperature gradient, thereby decreasing the effect of the intruding heat on the cryogenic-temperature side. In particular, the present invention accomplishes a sealing-end structure having a further decreased size by providing the narrow-clearance portion (a portion in which the clearance between the inner surface of the coolant vessel and the outer circumference of the bushing is small), not by extending the length in the direction from the cryogenic-temperature side to the normal-temperature side. Furthermore, in the sealing-end structure of the present invention having the sufficient temperature gradient, a temperature variation is small in the vicinity of the boundary portion between the cryogenic-temperature side and the normal-temperature side from the completion of the assembly of the sealing end through the operation of the cable system. Therefore, the sealing-end structure can sufficiently maintain the airtightness in the vicinity of the boundary portion over a long period. The present invention is explained below in more detail.

A superconducting cable to be used in the present invention may have a structure that is provided with a cable core having a superconducting conductor and a heat-insulated pipe housing the core. More specifically, the cable core may have a structure that is provided with, from the center in the following order, a former, a superconducting conductor, an electrically insulating layer, a superconducting layer, and a protecting layer. The superconducting layer provided on the outer circumference of the electrically insulating layer is used as a superconducting shielding layer, a return conductor, or the like. Such a cable core may be composed of either a single core or multiple cores. In other words, the superconducting cable to be used may either be a single-core cable or be a multicore cable. The superconducting cable to be used may also be either for a DC use or for an AC use. Of course, a commonly known superconducting cable may also be used.

In the present invention, the bushing is specified to be provided with (a) a conductor portion that can provide electrical continuity with the superconducting conductor of the above-described superconducting cable and (b) a solid insulating layer that covers the outer circumference of the conductor portion. It is recommended that the conductor portion of the bushing be formed by using a conducting material such as a metal that has a small electric resistivity at the temperature (coolant temperature) at which the superconducting cable is used. Here, the temperature is in the vicinity of the temperature of liquid nitrogen when liquid nitrogen is used as the coolant, for example. The types of the foregoing metal include copper and aluminum, both of which have a resistivity, $\rho$, of $2 \times 10^{-7}$ $\Omega \cdot cm$ at 77 K. The solid insulating layer can be formed with a resinous material having excellent electric-insulation property, such as ethylene-propylene rubber or another insulating rubber material. However, it is particularly desirable to use fiber-reinforced plastic (FRP). In the case of FRP, the machining precision at the outer surface can be increased. Therefore, the clearance between the inner surface of the coolant vessel (narrow-clearance portion) and the outer circumference of the bushing can be further decreased. In the case where the coolant vessel is formed with a metal such as stainless steel, when the bushing is designed to have a structure in which the solid insulating layer is formed, for example, by using FRP and its outer circumference is covered with a metallic material such as stainless steel, both the inner surface of the coolant vessel and the outer circumference of the bushing are formed with metal. This structure enables the employment of the so-called bayonet-type structure. As a result, this structure can further decrease the clearance at the narrow-clearance portion.

This bushing is placed from the cryogenic-temperature side to the normal-temperature side. A one-end side of the bushing is housed in the below-described coolant vessel. The coolant vessel is housed in a vacuum container. The vacuum container is provided with a vacuum heat-insulating space at the space between the coolant vessel and the vacuum container. It is desirable that the coolant vessel and the vacuum container be formed with a metal having excellent strength such as stainless steel. The vacuum container may have a structure similar to that of the conventional vacuum container. The other-end side of the bushing is housed in a porcelain bushing placed so as to be erected on the vacuum container. The porcelain bushing is filled with an insulating liquid, an insulating gas, or another insulating fluid each having excellent electric-insulation property, such as insulating oil or $SF_6$.

The coolant vessel in which a one-end side of the bushing is housed may have a structure that is provided with the following members:
(a) a main-body portion that houses the end portion of the bushing and a jointing portion that joints an end portion of the superconducting cable (cable core) and the end portion of the bushing, and
(b) a pipe-shaped portion in which an intermediate portion of the bushing is housed.

The main-body portion is provided so as to have a size capable of housing the above-described portions. The pipe-shaped portion is provided so as to have a size capable of allowing the bushing to pass through the inside of it. In the present invention, the coolant vessel is filled with a liquid coolant and a gaseous coolant. Consequently, the space inside the coolant vessel has (a) a liquid-coolant region filled with the liquid coolant and (b) a gaseous-coolant region that is provided at the normal-temperature side in relation to the location of the foregoing liquid-coolant region and that is filled with the gaseous coolant. The main-body portion of the coolant vessel is designed to have the liquid-coolant region filled with the liquid coolant. The pipe-shaped portion may be designed either to have only the gaseous-coolant region that allows the existence of the gaseous coolant only or to have both the liquid-coolant region and the gaseous-coolant region allowing the existence of the liquid coolant and the gaseous coolant, respectively.

The types of the gaseous coolant and the liquid coolant may either be the same or different. For example, the types of the gaseous coolant include nitrogen gas and helium gas, and the types of the liquid coolant include liquid nitrogen and liquid helium.

The present invention has the utmost feature in that the above-described coolant vessel is provided with a contraction-absorbing portion for absorbing the amount of the contraction of the coolant vessel when it thermally contracts by the effect of the coolant. The contraction-absorbing portion is required only to have a structure capable of absorbing the thermal contraction of the coolant vessel. It may be formed with a material having flexibility and expanding-and-contracting property. The contraction-absorbing portion may be provided either at the main-body portion of the coolant vessel or at the pipe-shaped portion. In the case of the former, the contraction-absorbing portion may be provided by forming a part of the main-body portion to a shape capable of expanding and contracting. In the case of the latter, the contraction-absorbing portion may be provided by using a bellows pipe that has a size (inner diameter) capable of allowing the bushing to pass through the inside of it and that has alternating ridges and grooves along its length. In other words, the structure has the contraction-absorbing portion at the outer side of the bushing.

In addition to the foregoing contraction-absorbing portion, a sealing-end structure of the present invention may have a region having a narrow clearance between an inner surface of the coolant vessel and the outer circumference of the bushing. The specific size (clearance) of the region is designed such that the size not only maintains the gaseous coolant at a gaseous state without pressurizing it by using a compressor but also maintains the pressure of the gaseous coolant and that of the liquid coolant in equilibrium. In other words, the size of the region is designed not only so as to allow the presence of the boundary between the gaseous coolant and the liquid coolant in the region but also so as to enable the achieving of the state of equilibrium between the pressure of the gaseous coolant and that of the liquid coolant. Such a region is formed at the narrow-clearance portion. In other words, it is designed that the above-described boundary lies at the space inside the narrow-clearance portion. It is recommended that the size of the narrow-clearance portion be adjusted according to the filling pressure of the liquid coolant, the magnitude of the intruding heat, the outer diameter of the bushing, and so on. For example, in the case where (a) liquid nitrogen is used as the liquid coolant, (b) nitrogen gas is used as the gaseous coolant, (c) the bushing has a diameter of 100 to 200 mm or so, and (d) the liquid coolant has a pressure of 0.3 to 0.5 MPa or so, the following design may be employed:

(a) the narrow-clearance portion has an inner diameter that is predetermined so that the clearance between the inner surface of the coolant vessel (narrow-clearance portion) and the outer circumference of the bushing can become 0.1 to 2.5 mm or so, and (b) the narrow-clearance portion has a length (the longitudinal distance in the direction from the cryogenic-temperature side to the normal-temperature side) of 300 to 500 mm or so.

When the length of the narrow-clearance portion is further shortened, it is recommended that the inner diameter of the narrow-clearance portion be increased to a certain extent. It is recommendable to select the length and inner diameter of the above-described narrow-clearance portion so that the sealing-end structure can have a desired size.

The foregoing narrow-clearance portion is provided at the place where the bushing is placed in the above-described coolant vessel. More specifically, it is recommendable to provide the narrow-clearance portion in at least one part of the pipe-shaped portion. Consequently, the entire pipe-shaped portion may be formed as the narrow-clearance portion. Alternatively, part of the pipe-shaped portion may be formed as the narrow-clearance portion. In the case of the former, the narrow-clearance portion may be provided such that the boundary between the gaseous coolant and the liquid coolant is positioned either at the boundary between the pipe-shaped portion and the main-body portion or at the narrow-clearance portion (pipe-shaped portion).

It is desirable that the above-described narrow-clearance portion be formed by using a smooth pipe having a longitudinally smooth surface. When the pipe has a shape such as that of the bellows pipe, which has alternating ridges and grooves along its length, it is difficult to achieve the above-described equilibrium in pressure. Therefore, it is desirable to use a smooth pipe as the material for forming the narrow-clearance portion. In this case, one-half the difference between the inner diameter of the smooth pipe and the outer diameter of the bushing is equal to the clearance between the inner surface of the narrow-clearance portion and the outer circumference of the bushing.

The above-described narrow-clearance portion is a member for forming a portion in which the clearance between the inner surface of the coolant vessel and the outer circumferential surface of the bushing is small. Because of the small clearance, the liquid coolant at the normal-temperature side can be gasified by the intruding heat from the normal-temperature side to become the gaseous coolant, and the liquid coolant at the cryogenic-temperature side can maintain the state of liquid without changing the state. In other words, a sufficient temperature gradient can be provided, and the gaseous coolant and the liquid coolant reach an equilibrium in the space inside the narrow-clearance portion. Consequently, a proper adjustment of the size of the narrow-clearance portion can maintain the gaseous coolant at the state of gas without pressurizing it by using a compressor (the compressor has been used in the conventional structure). Therefore, it is not necessary to provide a compressor separately. As a result, the number of constituting members can be decreased, thereby enabling a further reduction in the size of the sealing-end structure. In the present invention, because such a narrow-clearance portion is provided in the coolant vessel, the sealing members placed at the boundary between the cryogenic-temperature side and the normal-temperature side can be prevented from reducing the sealing performance due to the hardening resulting from the cooling by the coolant.

In the case where the above-described narrow-clearance portion is provided in the pipe-shaped portion of the coolant vessel and the above-described contraction-absorbing portion is provided in the main-body portion of the coolant vessel, when the coolant vessel thermally contracts, the liquid coolant in the main-body portion may move to the pipe-shaped portion. When this occurs, the liquid surface rises to the normal-temperature side. As a result, it may be impossible to provide a sufficient temperature gradient. Consequently, in the case where the narrow-clearance portion is provided in addition to the contraction-absorbing portion, it is desirable to provide the contraction-absorbing portion in the pipe-shaped portion as with the narrow-clearance portion. In particular, it is desirable to provide the contraction-absorbing portion at the normal-temperature side, which is filled with the gaseous coolant, of the pipe-shaped portion, because the magnitude of the rise of the liquid surface caused by the contraction can be decreased. When the contraction-absorbing portion is provided in the pipe-shaped portion of the coolant vessel, the narrow-clearance portion and the contraction-absorbing portion may be connected in tandem along their length. In this case, either the narrow-clearance portion or the contraction-absorbing portion may be placed at the cryogenic-temperature side. More specifically, any of the following arrangements may be employed:

(a) the narrow-clearance portion is placed at the cryogenic-temperature side, and the contraction-absorbing portion at the normal-temperature side, (b) the contraction-absorbing portion is placed at the cryogenic-temperature side, and the narrow-clearance portion at the normal-temperature side, and (c) the contraction-absorbing portion is placed at an intermediate position of the narrow-clearance portion.

In any arrangement, when the contraction-absorbing portion is formed by using a member having alternating ridges and grooves, such as a bellows pipe, it is difficult to carry out an adjustment so that the pressure of the gas and that of the liquid can reach an equilibrium. Consequently, the present invention employs a structure in which the gas and liquid are separated at the narrow-clearance portion. Alternatively, as described earlier, a structure may be employed in which the gas and liquid are separated at the boundary between the main-body portion and the pipe-shaped portion that is provided with the narrow-clearance portion.

As described above, the narrow-clearance portion and the contraction-absorbing portion may be connected in tandem along their length. In this case, however, the length of the pipe-shaped portion is extended, increasing the size of the sealing-end structure. Consequently, to decrease the length so that the sealing-end structure can have a further decreased size, the contraction-absorbing portion may be placed so as to overlap the narrow-clearance portion. More specifically, it is desirable that they be placed such that part of the narrow-clearance portion is inserted into the contraction-absorbing portion. In other words, they are placed in an overlapped state such that a one-end side of the contraction-absorbing portion lies at the outer side of the circumference of a one-end side of the narrow-clearance portion. In this case, it is recommendable to place them in such a way that the other end of the contraction-absorbing portion (the normal-temperature-side end portion) protrudes from the foregoing one end of the narrow-clearance portion (the normal-temperature-side end portion).

When the pipe-shaped portion is provided with both the narrow-clearance portion and the contraction-absorbing portion, depending on the pressure balance, the liquid coolant may excessively enter the narrow-clearance portion. When this occurs, the liquid surface of the liquid coolant may excessively rise toward the normal-temperature side, making it impossible to provide a sufficient temperature gradient. Consequently, in order to prevent the liquid coolant from excessively entering the narrow-clearance portion, the sizes of the narrow-clearance portion and contraction-absorbing portion are predetermined. More specifically, for example, in the case where (a) the bushing has a diameter of 100 to 200 mm or so, (b) the narrow-clearance portion is formed by using a smooth pipe having a circular cross section, and (c) the contraction-absorbing portion is formed by using a bellows pipe, the following design may be employed:

(a) the narrow-clearance portion has an inner diameter that is predetermined in such a way that:

(a1) the clearance between the inner circumference of the narrow-clearance portion and the outer circumference of the bushing becomes 0.1 to 2.5 mm or so, and (a2) in particular, the narrow-clearance portion has an inner diameter larger than the outer diameter of the bushing by 1 to 2 mm or so, (b) the narrow-clearance portion has a length of 300 to 500 mm or so, (c) the flexible portion (bellows pipe) of the contraction-absorbing portion has a length of 100 to 400 mm or so, and (d) the flexible portion has the minimum inner diameter larger than the outer diameter of the narrow-clearance portion by 10 to 20 mm or so.

It is also conceivable to form both the narrow-clearance portion and contraction-absorbing portion by using only a bellows pipe. In this case, however, as described above, it is difficult to achieve an equilibrium in pressure. Consequently, the liquid coolant may enter the normal-temperature side (into the porcelain bushing), making it impossible to provide a sufficient temperature gradient. Therefore, it is desirable to form the narrow-clearance portion by using a smooth pipe.

It is recommendable to introduce the gaseous coolant and liquid coolant into the foregoing coolant vessel by the following way. For example, first, the gaseous coolant is introduced into the coolant vessel. Subsequently, the liquid coolant is introduced so that the pressure of the gaseous coolant and that of the liquid coolant can reach a state of equilibrium in the narrow-clearance portion. Then, the coolant vessel can be sealed such that the both coolants maintain the state of equilibrium. The above-described sealing operation for the coolant vessel can maintain the pressurized state of the gaseous coolant without performing the pressurization with a compressor. The liquid coolant may either be cooled by using a refrigerator or the like so as to maintain a proper temperature or be cooled by a circulating cooling, which circulates the coolant. The performing of the circulating cooling may vary the position of the liquid surface to a certain extent in the narrow-clearance portion resulting from the movement of the liquid coolant. Nevertheless, the state of equilibrium can be maintained by adjusting the circulating pressure for the liquid coolant or the like so that the pressure of the gaseous coolant and that of the liquid coolant can maintain the state of equilibrium.

In a sealing-end structure of the present invention provided with a narrow-clearance portion, the gaseous coolant is under the pressurized condition to a certain extent. Consequently, the liquid coolant is pressed toward the cryogenic-temperature side, preventing the liquid coolant from leaking to the normal-temperature side. Nevertheless, it is desirable to further provide a leakage-preventing member separately because this member can more effectively prevent the liquid coolant from leaking. The leakage-preventing member may have any shape without special limitations on condition that it can suppress the liquid coolant from leaking to the normal-temperature side. For example, it may have the shape of a ring that can be placed by sliding it onto the outer circumference of the bushing. In the case where the narrow-clearance portion is provided such that the boundary between the gaseous coolant and the liquid coolant is positioned at the boundary between the pipe-shaped portion and the main-body portion, the leakage-preventing member may have a shape suitable for the shape in the vicinity of the boundary between the main-body portion and pipe-shaped portion of the coolant vessel. The leakage-preventing member may be made of a rubber-based resinous material such as ethylene-propylene rubber. Nevertheless, it is desirable to use a silicone-based resinous material because it has excellent resistance to a coolant such as liquid nitrogen.

Effect of the Invention

A sealing-end structure of the present invention having a contraction-absorbing portion in the coolant vessel can absorb the contraction of the coolant vessel by the contraction-absorbing portion even when the coolant vessel contracts due to the cooling by the coolant at the time the coolant is introduced into the coolant vessel. Consequently, the sealing-end structure can prevent problems accompanying the contraction such as the destruction of the sealing-end structure.

In addition, a sealing-end structure of the present invention provides the coolant vessel with a narrow-clearance portion having a specific size. Consequently, the coolant vessel can have a sufficient temperature gradient form the cryogenic-temperature side to the normal-temperature side without excessively increasing the length of the portion where the bushing is placed. As a result, this structure can prevent problems such as a decrease in sealing performance in the vicinity of the boundary between the normal-temperature side and the cryogenic-temperature side. Therefore, the sealing-end structure of the present invention can achieve the prevention of the leakage of the gaseous coolant to the normal-temperature side over a long period of use.

Furthermore, a sealing-end structure of the present invention specifies the size of the narrow-clearance portion as described above. Consequently, the gaseous coolant becomes under a pressurized condition on its own without using a compressor. Therefore, the liquid coolant can be pressed toward the cryogenic-temperature side, making it difficult for the liquid coolant to rise toward the normal-temperature side. As a result, the gaseous-coolant region can maintain the temperature gradient sufficiently, so that the sealing performance can be effectively prevented from deteriorating. In addition, as described above, because a compressor is not required, the number of constituting members can be decreased.

Such a sealing-end structure of the present invention is suitable for being provided at a place where electric power is transferred between the normal-temperature side and the cryogenic-temperature side in a superconducting-cable line. It can be used to output electric power, to input electric power, or to both input and output electric power.

EXPLANATION OF THE SIGN

Figure 1A:
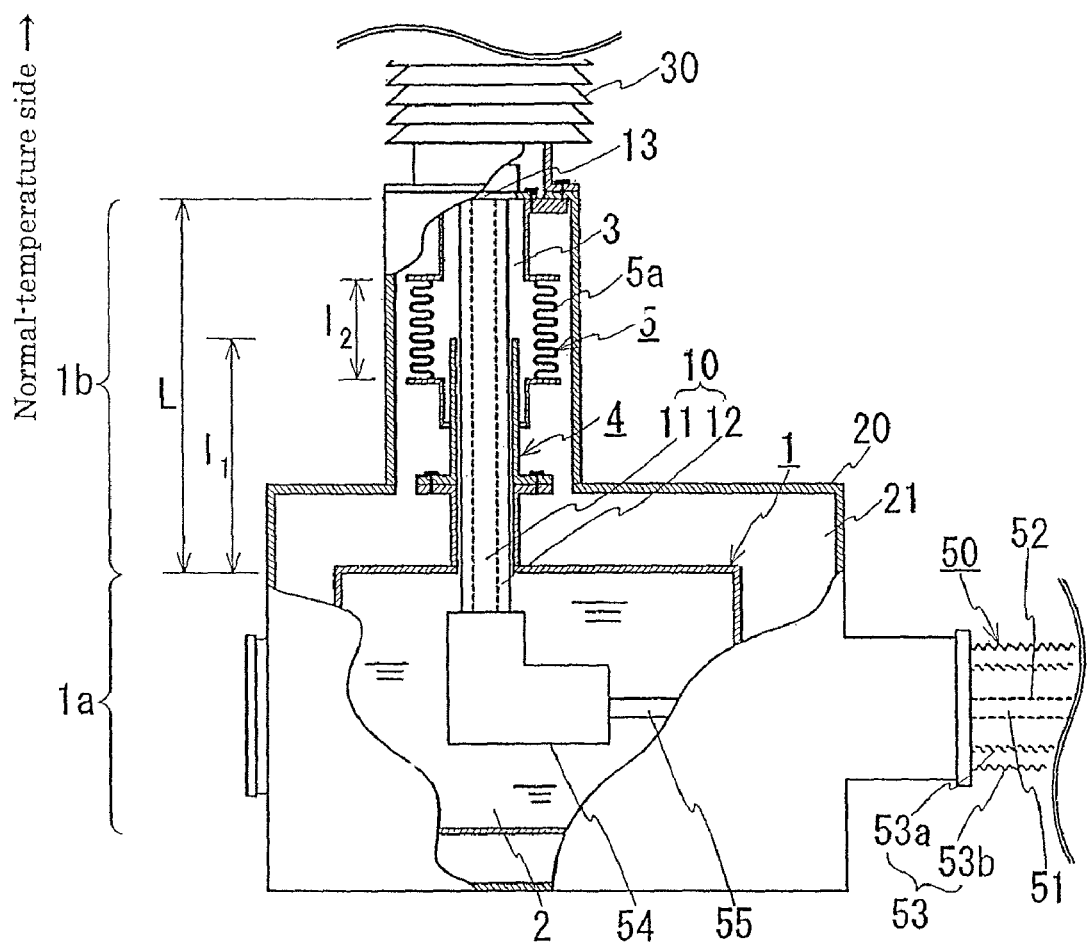
FIG. 1(A) is a schematic constitution diagram showing a partial cross section of a sealing-end structure for a superconducting cable of the present invention.

1: Coolant vessel; 1a: Main-body portion; 1b: Pipe-shaped portion; 2: Liquid coolant; 3: Gaseous coolant; 4: narrow-clearance portion; 5: Contraction-absorbing portion; 5a: Bellows pipe; 5b: Attaching piece; 5c: Flange; 10: Bushing; 11: Conductor portion; 12: Solid insulating layer; 13: Flange; 20: Vacuum container; 21: Vacuum heat-insulating space; 30: Porcelain bushing; 50: Superconducting cable; 51: Superconducting conductor; 52: Cable core; 53: Heat-insulated pipe; 53a: Inner pipe; 53b: Outer pipe; 54: Joint; 55: Connecting conductor; 60 to 62: Sealing member; 100: Superconducting cable; 101: Coolant vessel; 102: Bushing; 102a: Conductor portion; 102b: Solid insulating layer; 102c and 102d: Flange; 103: Vacuum container; 103a: Intermediate vacuum portion; 104: Porcelain bushing; 105: Joint.

BEST MODE FOR CARRYING OUT THE INVENTION

Embodiments of the present invention are explained below. In the following drawing, the same sign indicates the same item. The ratio of the dimensions in the drawing does not necessarily coincide with that used in the explanation.

Figure 1B:
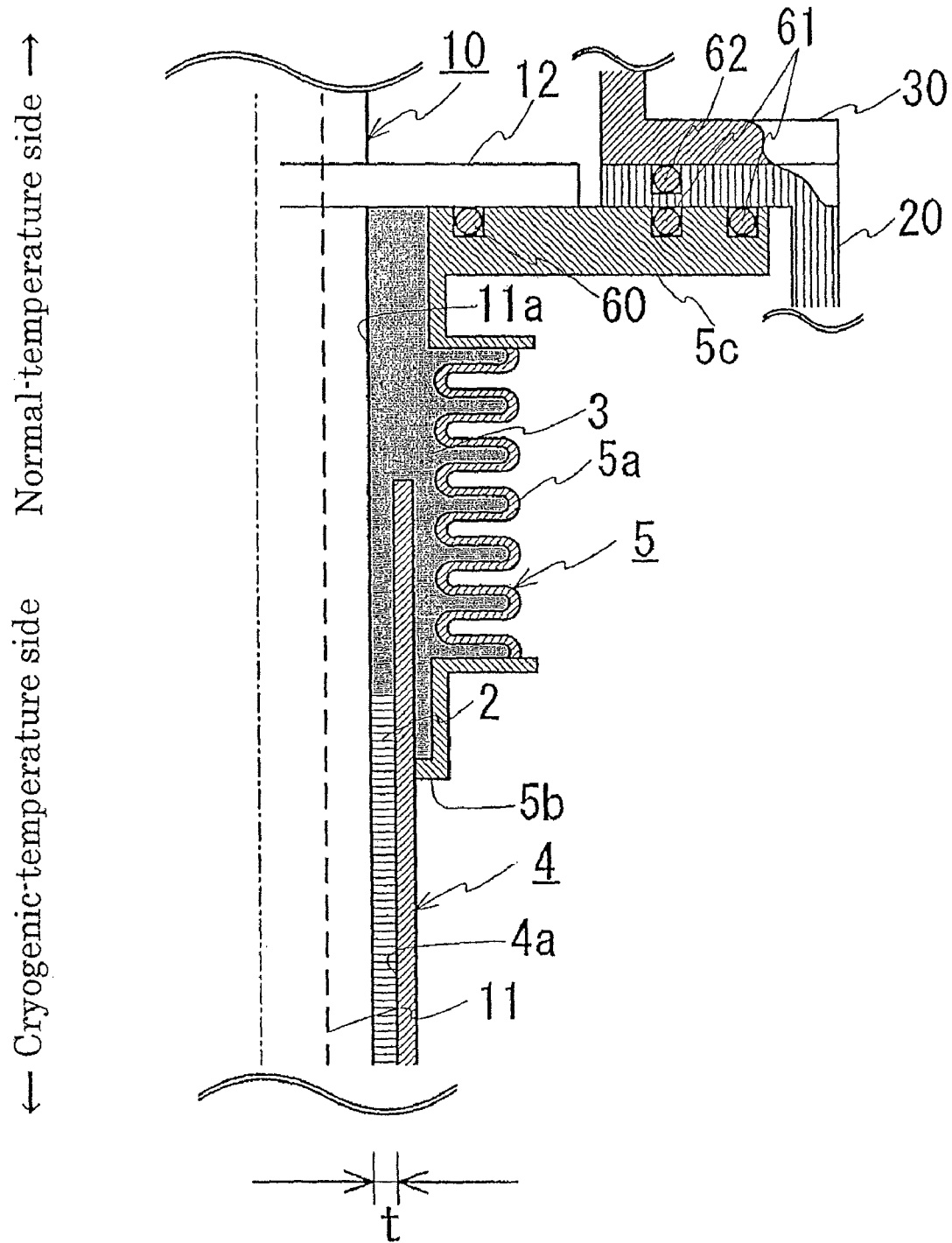
FIG. 1(B) is an enlarged partial cross section showing a part of a pipe-shaped portion of a coolant vessel.
Figure 2:
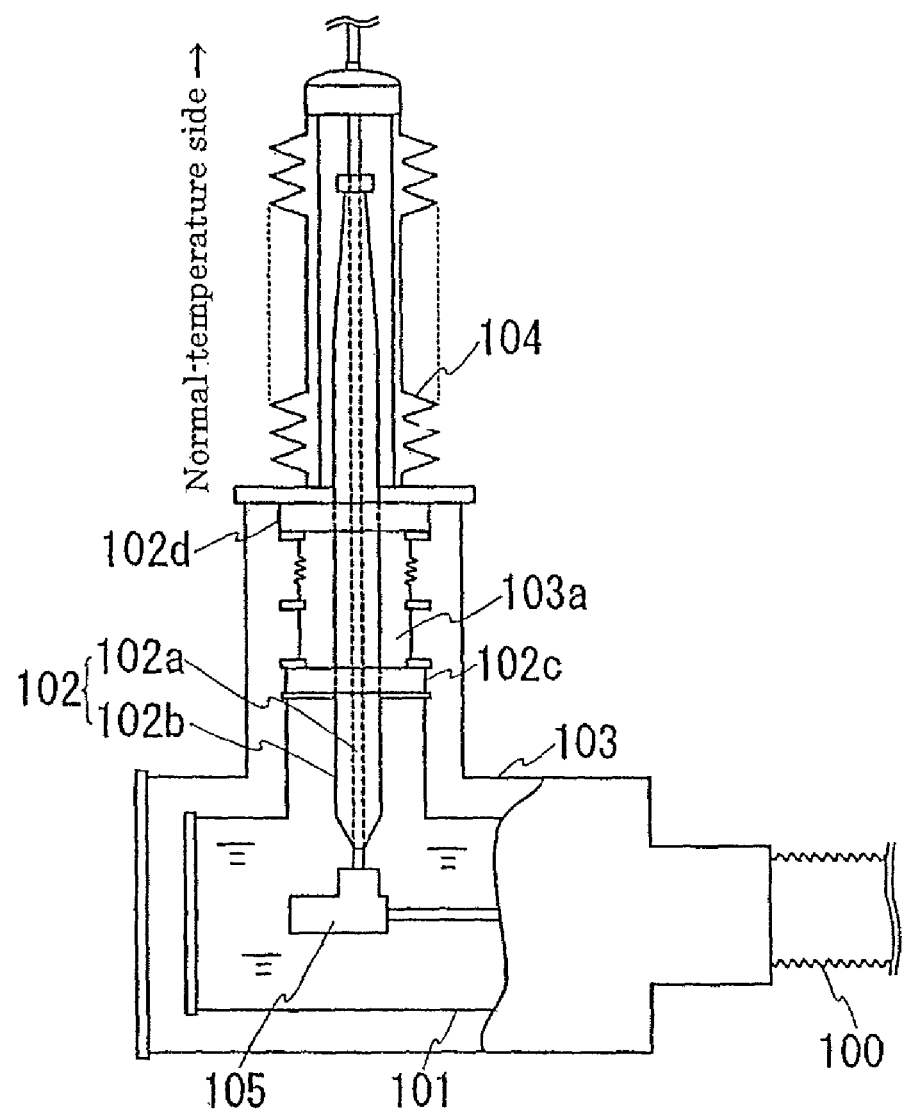
FIG. 2 is a schematic constitution diagram showing a conventional sealing-end structure for a superconducting cable.

FIG. 1(A) is a schematic constitution diagram showing a partial cross section of a sealing-end structure for a superconducting cable of the present invention. FIG. 1(B) is an enlarged partial cross-sectional view showing a part of a pipe-shaped portion of a coolant vessel. The sealing-end structure per-forms, through a bushing 10, the outputting and inputting of electric power between a normal-temperature side and a cryogenic-temperature side, at which an end portion of a superconducting cable 50 is placed. More specifically, the sealing-end structure is provided with the following members:

(a) an end portion of the superconducting cable 50,
(b) a bushing 10 that is connected to a superconducting conductor 51 of the cable 50 and provides electrical continuity from the cryogenic-temperature side to the normal-temperature side,
(c) a joint 54 that connects the end portion of the superconducting cable 50 and the bushing 10,
(d) a coolant vessel 1 that houses the joint 54 and the bushing 10,
(e) a vacuum container 20 that covers the periphery of the coolant vessel 1, and
(f) a porcelain bushing 30 that is mounted on the vacuum container 20 so as to be erected at the normal-temperature side.

The coolant vessel 1 is provided with the following two regions neighboring to each other:
(a) a liquid-coolant region filled with a liquid coolant 2 at the cryogenic-temperature side, and
(b) a gaseous-coolant region filled with a gaseous coolant 3 at the side closer to the normal-temperature side than the liquid-coolant region.

The coolant vessel 1 is provided with the following members:
(a) a main-body portion 1a that houses an end portion of the bushing 10 and a jointing portion (a joint 54) that joints the end portion of the bushing 10 and an end portion of the superconducting cable 50, and
(b) a pipe-shaped portion 1b through the inside of which an intermediate portion of the bushing 10 is placed.

The main-body portion 1a forms the liquid-coolant region filled with the liquid coolant 2. The pipe-shaped portion 1b has (a) the liquid-coolant region filled with the liquid coolant 2 at the cryogenic-temperature side and (b) the gaseous-coolant region filled with the gaseous coolant 3 at the normal-temperature side. In this example, liquid nitrogen is used as the liquid coolant 2, and nitrogen gas as the gaseous coolant 3.

The present invention has a feature in that the pipe-shaped portion 1b is provided with a narrow-clearance portion 4 and a contraction-absorbing portion 5. The narrow-clearance portion 4 has a clearance, t, between an inner surface 4a of the narrow-clearance portion 4 and an outer circumference 11a of the bushing 10. The clearance, t, not only maintains the nitrogen gas at a gaseous state without pressurizing it by using a compressor but also forms a region having a size for maintaining the pressure of the nitrogen gas and that of the liquid nitrogen in equilibrium. The contraction-absorbing portion 5 is a place for absorbing the contraction of the coolant vessel 1 when the coolant vessel 1 contracts by the cooling by the coolant introduced into the coolant vessel 1. The individual constituent members are explained below in detail.

In this example, the superconducting cable 50 has a constitution in which a cable core 52 having a superconducting conductor 51 is housed in a heat-insulated pipe 53. The cable core 52 is provided with, from the center in the following order, a former, the superconducting conductor 51, an electrically insulating layer, a superconducting layer, and a protecting layer. The heat-insulated pipe 53 has a dual-pipe structure composed of an inner pipe 53a and an outer pipe 53b. A heat-insulating layer is formed by helically lapping a heat-insulating material on the outer circumference of the inner pipe 53a. The space between the inner pipe 53a and the outer pipe 53b is evacuated to attain a specified vacuum degree. The inside of the inner pipe 53a is filled with a coolant (in this example, liquid nitrogen) for cooling the cable core 52. At the end portion of the superconducting cable 50, the cable core 52 is exposed and the constitutional members are removed in the shape of a step. The thus exposed superconducting conductor 51 is connected with a connecting conductor 55 made of a normally conducting material such as copper. The connecting conductor 55 is connected to a conductor portion 11 of the bushing 10 by using the joint 54.

In this example, the bushing 10 (diameter: 140 mm) has (a) the conductor portion 11 (diameter: 40 mm) capable of providing electrical continuity to the superconducting conductor 51 of the superconducting cable 50 and (b) a solid insulating layer 12 (thickness: 50 mm) that covers the outer circumference of the conductor portion 11. In this example, the conductor portion 11 is made of copper, which has small electric resistivity in the vicinity of the temperature of the liquid nitrogen. The solid insulating layer 12 is formed by using FRP, which is excellent in electric-insulation property and mechanical processibility. On the outer circumference of an intermediate position of the bushing 10, a flange 13 is provided for fixing the bushing 10 to the coolant vessel 1 (the below-described flange 5c). The flanges 5c and 13 form a boundary that separates (a) the cryogenic-temperature side (coolant vessel 1) in which the coolant, such as liquid nitrogen and nitrogen gas, is filled and (b) the normal-temperature side (the porcelain bushing 30) in which an insulating fluid such as $SF_6$ is filled. The bushing 10 is provided with an upper shield (not shown) made of copper at its normal-temperature-side end portion. The joint 54 is provided with a lower shield (not shown).

In this example, both the main-body portion 1a and the pipe-shaped portion 1b of the coolant vessel 1 are formed with stainless steel. The main-body portion 1a is a container having a size sufficient for housing the following members:
 (a) the connecting conductor 55 connected to the superconducting conductor 51 protruding from the cable core 52 at the end portion of the superconducting cable 50,
 (b) the foregoing end portion of the bushing 10, and
 (c) the joint 54 connecting the end portions of the foregoing two members.

The main-body portion 1a is filled with liquid nitrogen. The main-body portion 1a is designed not only so as to be connected to a refrigerator for cooling the liquid nitrogen but also so as to be connected to a feeding pipe of the liquid nitrogen and a discharging pipe when circulating cooling is performed (the members to be connected are not shown). The main-body portion 1a is housed in the vacuum container 20 formed with stainless steel. This structure has a vacuum heat-insulating space 21 that is provided between the vacuum container 20 and the coolant vessel 1 and that is evacuated to a specified vacuum degree.

The pipe-shaped portion 1b of the coolant vessel 1 has the shape of a pipe having a size sufficient for allowing the bushing 10 to pass through the inside of it. The pipe-shaped portion 1b is provided with the narrow-clearance portion 4 at the cryogenic-temperature side and the contraction-absorbing portion 5 at the normal-temperature side. In this example, the narrow-clearance portion 4 is formed by using a smooth pipe. The contraction-absorbing portion 5 is formed by using a pipe-shaped body having a bellows pipe 5a at an intermediate position. This example employs a structure in which the contraction-absorbing portion 5 overlaps the narrow-clearance portion 4 such that a part of the pipe-shaped body forming the contraction-absorbing portion 5 is positioned at the outer side of the circumference of a part of the smooth pipe forming the narrow-clearance portion 4. More specifically, an attaching piece 5b is provided at one end of the contraction-absorbing portion 5. The attaching piece 5b is fixed to the outer circumference of an intermediate portion of the narrow-clearance portion 4 by using welding or another similar method. Consequently, the normal-temperature-side end portion of the narrow-clearance portion 4 is positioned inside the contraction-absorbing portion 5. The other end of the contraction-absorbing portion 5 has a flange 5c for fixing it to the flange 13 of the bushing 10. The coolant vessel 1 is fixed to the vacuum container 20 by fixing the flange 5c of the contraction-absorbing portion 5 to the flange 13 of the bushing 10 and by fixing the flange 5c to the vacuum container 20. The boundary between the cryogenic-temperature side (coolant vessel 1) and the normal-temperature side (porcelain bushing 30) is formed by the boundaries between the flanges 5c and 13 and between the flange 5c and the vacuum container 20. Consequently, to maintain the airtightness, sealing members 60 and 61 are placed between the flanges 5c and 13 and between the flange 5c and the vacuum container 20, respectively. In addition, a sealing member 62 is also placed between the vacuum container 20 and the porcelain bushing 30 to prevent the insulating fluid from leaking to the outside of the porcelain bushing 30. These sealing members 60 to 62 are made of metallic sealing material.

This example employs the following dimensions:
 (a) the clearance, t, between the inner surface 4a of the narrow-clearance portion 4 and the outer circumference 11a of the bushing 10: 2.5 mm,
 (b) the length, $l_1$, of the narrow-clearance portion 4: 400 mm,
 (c) the length, $l_2$, of the bellows pipe of the contraction-absorbing portion 5: 160 mm,
 (d) the outer diameter of the largest portion of the bellows pipe: 170 mm, and
 (e) the length, L, of the pipe-shaped portion 1b: 450 mm.

In this example, the inside space of the narrow-clearance portion 4 at the cryogenic-temperature side is filled with liquid nitrogen, and the inside space of the narrow-clearance portion 4 at the normal-temperature side and the contraction-absorbing portion 5 are filled with nitrogen gas. In other words, the inside space of the narrow-clearance portion 4 has a boundary between the liquid nitrogen and the nitrogen gas. Such a state is realized by filling the coolant vessel 1 with the coolant through the following procedure. First, before introducing the liquid nitrogen into the coolant vessel 1, the coolant vessel 1 is filled with nitrogen gas to remove moisture and other undesirable matters from the coolant vessel 1. Subsequently, liquid nitrogen is supplied into the coolant vessel 1 while allowing the nitrogen gas to remain at a part of the space inside the narrow-clearance portion 4. At this moment, the liquid nitrogen is introduced into the coolant vessel 1 so that the pressure of the liquid nitrogen in the coolant vessel 1 can reach about 0.5 MPa. Then, the coolant vessel 1 is sealed. By employing this structure, in the space inside the narrow-clearance portion 4, not only can the nitrogen gas maintain a gaseous state by its own pressure but also the pressure of the nitrogen gas and that of the liquid nitrogen nearly achieve a state of equilibrium. By providing such a narrow-clearance portion 4, a sufficient temperature gradient can be established from the cryogenic-temperature side to the normal-temperature side without excessively increasing the region of the gaseous coolant. As a result, the remaining nitrogen gas described above can maintain the state of gas by the intruding heat from the normal-temperature side, and the liquid nitrogen can maintain the state of liquid. Furthermore, the sealing member 60 placed at the boundary between the normal-temperature side and the cryogenic-temperature side (more specifically, between the flanges 5c and 13) is not subjected to a great temperature change from the time of the assembly. Therefore, it is possible to effectively prevent the deterioration of the sealing performance. Consequently, the sealing-end structure for a superconducting cable of the present invention can maintain the condition of the airtightness between the normal-temperature side and the cryogenic-temperature side over a long period of use.

When the coolant vessel 1 is cooled by the introduction of the liquid nitrogen into the coolant vessel 1, the coolant vessel 1 tends to contract thermally. This creates a thermal stress between the coolant vessel 1 and the vacuum container 20, which is nearly at the atmospheric temperature. At this moment, because the coolant vessel 1 is fixed to the vacuum container 20 through the flange 5c, the thermal stress may create problems such as the disengagement of the coolant vessel 1 at the fixed portion. Nevertheless, because the sealing-end structure of the present invention has the contraction-absorbing portion 5, the above-described contraction can be absorbed by the contraction-absorbing portion 5. Therefore, the sealing-end structure for a superconducting cable of the present invention can prevent the problems resulting from the contraction even when the coolant vessel is cooled by the coolant and produces thermal contraction. In particular, in this example, because the contraction-absorbing portion 5 is provided at the normal-temperature side of the pipe-shaped portion 1b of the coolant vessel 1, the contraction-absorbing portion 5 changes its shape easily when absorbing the thermal contraction. In addition, this constitution can decrease the amount of the rising of the liquid surface of the liquid coolant toward the normal-temperature side.

In addition, the sealing-end structure for a superconducting cable of the pre-sent invention requires no compressor for maintaining the gaseous coolant at a state of gas in the region of the gaseous coolant. Consequently, this structure can eliminate the pressurizing equipment, thereby enabling a further reduction in size.

TEST EXAMPLE

The bushing described in the above example was used to examine the state of deterioration of the sealing members placed between the flanges by varying the size of the narrow-clearance portion (the clearance, t, and length, $l_1$). The pressure of the liquid nitrogen was varied in a range of 0.3 to 0.5 MPa according to the clearance, t, and the length, $l_1$. The test specimens were maintained for 60 hours under the above-described condition. The test revealed that when the clearance, t, was in a range of 0.1 to 2.5 mm and the length, $l_1$, was in a range of 300 to 500 mm, no leakage of gas was observed, proving that the specimens have a sufficient sealing performance. The test results also showed that as the clearance, t, is decreased and as the length, $l_1$, is increased, it is easy to achieve the temperature gradient. The test also unveiled that when the clearance, t, is further decreased, it is desirable that the outer circumference of the bushing be covered with a metallic material such as stainless steel. For a structure that circulates the coolant, it is recommended that the pressure of the liquid nitrogen be adjusted in a range of 0.3 to 0.5 MPa in accordance with the clearance, t, and the length, $l_1$, so as to reach an equilibrium with the pressure of the nitrogen gas.

In addition to the above-described structure, a leakage-preventing member may be placed to more effectively prevent the liquid coolant from leaking out to the normal-temperature side. A structure may be employed that places the leakage-preventing member in the vicinity of the boundary between the liquid-coolant region and the gaseous-coolant region. The leakage-preventing member may have the shape of a ring so as to be easily placed on the outer circumference of the bushing 10. It may be formed by using silicone resin, which has excellent resistance to the liquid nitrogen.

When such a leakage-preventing member is placed, not only can the liquid nitrogen be suppressed from leaking to the normal-temperature side but also the sealing members of the flanges can be prevented from being cooled due to the contact with the liquid coolant. The leakage-preventing member does not completely seal between the liquid-coolant region and the gaseous-coolant region, and it is designed to have a size such that the pressure of the liquid coolant can be applied to the gaseous coolant.

INDUSTRIAL APPLICABILITY

A sealing-end structure of the present invention is suitable for being applied to the sealing end of a superconducting cable. The sealing-end structure of the present invention can be applied to both DC transmission and AC transmission.

The invention claimed is:

1. A sealing-end structure for a superconducting cable, the sealing-end structure comprising:
   (a) an end portion of a superconducting cable;
   (b) a bushing through which electric power is outputted and inputted between a normal-temperature side and a cryogenic-temperature side, at which the end portion of the superconducting cable is placed;
   (c) a coolant vessel that:
      (c1) is placed at the cryogenic-temperature side;
      (c2) is filled with a liquid coolant and a gaseous coolant both for cooling the bushing; and
      (c3) is provided with a contraction-absorbing portion for absorbing the contraction of the coolant vessel when it thermally contracts by the effect of the coolant; and
   (d) a narrow-clearance portion in which a clearance between an inner surface of the coolant vessel and an outer circumference of the bushing is 0.1 to 2.5 mm,
   wherein the narrow-clearance portion maintains the gaseous coolant at a gaseous state without pressurizing it by using a compressor, and maintains the pressure of the gaseous coolant and that of the liquid coolant in equilibrium, and a boundary between the gaseous coolant and the liquid coolant lies at a space inside the narrow-clearance portion.

2. A sealing-end structure for a superconducting cable as defined by claim 1, wherein the coolant vessel is further provided with a narrow-clearance portion that is designed such that:
(a) the clearance between an inner surface of the narrow-clearance portion and an outer circumference of the bushing has a magnitude that not only maintains the gaseous coolant at a gaseous state without pressurizing it by using a compressor but also maintains the pressure of the gaseous coolant and that of the liquid coolant in equilibrium; and
(b) the boundary between the liquid coolant and the gaseous coolant lies at the narrow-clearance portion.

3. A sealing-end structure for a superconducting cable as defined by claim 2, wherein:
(a) the coolant vessel is further provided with:
   (a1) a main-body portion that houses an end portion of the bushing; and
   (a2) a pipe-shaped portion that houses an intermediate portion of the bushing; and
(b) the narrow-clearance portion IS located III at least one part of the pipe-shaped portion.

4. A sealing-end structure for a superconducting cable as defined by claim 2, wherein:
(a) the coolant vessel is further provided with:
   (a1) a main-body portion that houses an end portion of the bushing; and
   (a2) a pipe-shaped portion that houses an intermediate portion of the bushing;
(b) the narrow-clearance portion is:
   (b1) located in the pipe-shaped portion; and
   (b2) formed by using a smooth pipe having a longitudinally smooth surface; and
(c) the contraction-absorbing portion is:
   (c1) located in the pipe-shaped portion; and
   (c2) formed by using a bellows pipe having alternating ridges and grooves along its length.

5. A sealing-end structure for a superconducting cable as defined by claim 4, wherein the smooth pipe and the bellows pipe are placed such that part of the smooth pipe is inserted into the bellows pipe.

6. A sealing-end structure for a superconducting cable as defined by claim 1, wherein the narrow-clearance portion has a length of 300 to 500 mm.

7. A sealing-end structure for a superconducting cable as defined by claim 1, wherein the liquid coolant has a pressure of 0.3 to 0.5 MPa.

* * * * *